(12) United States Patent
Motoyoshi (10) Patent No.: US 10,341,063 B2
(45) Date of Patent: Jul. 2, 2019

(54) SATELLITE COMMUNICATION SYSTEM AND SATELLITE COMMUNICATION GROUND APPARATUS

(71) Applicant: Mitsubishi Electric Corporation, Chiyoda-ku (JP)

(72) Inventor: Katsuyuki Motoyoshi, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/563,742

(22) PCT Filed: Apr. 22, 2015

(86) PCT No.: PCT/JP2015/062239
§ 371 (c)(1),
(2) Date: Oct. 2, 2017

(87) PCT Pub. No.: WO2016/170617
PCT Pub. Date: Oct. 27, 2016

(65) Prior Publication Data
US 2018/0083741 A1 Mar. 22, 2018

(51) Int. Cl.
*H04L 1/18* (2006.01)
*H04B 7/195* (2006.01)
(Continued)

(52) U.S. Cl.
CPC ....... *H04L 1/1864* (2013.01); *H04B 7/18513* (2013.01); *H04B 7/195* (2013.01);
(Continued)

(58) Field of Classification Search
CPC ..... H04L 1/1864; H04L 5/0053; H04B 7/195; H04B 7/18513; H04W 72/042; H04H 20/74
See application file for complete search history.

(56) References Cited

U.S. PATENT DOCUMENTS

| 6,587,687 B1 | 7/2003 | Wiedeman |
| 2001/0036162 A1 | 11/2001 | Yokosuka et al. |
| 2006/0155840 A1* | 7/2006 | Giffin .......... H04B 7/18578 709/224 |

FOREIGN PATENT DOCUMENTS

| JP | 63-179629 A | 7/1988 |
| JP | 7-83305 B2 | 9/1996 |

(Continued)

OTHER PUBLICATIONS

International Search Report dated Jun. 2, 2015, in PCT/JP2015/062239, filed Apr. 22, 2015.

*Primary Examiner* — Samir W Rizk
(74) *Attorney, Agent, or Firm* — Oblon, McClelland, Maier & Neustadt, L.L.P.

(57) ABSTRACT

A satellite communication system includes a plurality of satellite communication ground apparatuses to decode data encoded by an error-detecting code received over a downlink channel, and request retransmission on data in which an error has been detected by the decoding, and a non-geostationary satellite to emit radio waves on the downlink channel to transmit data to the satellite communication ground apparatuses by the downlink channel, and retransmit data that the non-geostationary satellite has been requested by the satellite communication ground apparatuses to retransmit, intensively in a time period during which the non-geostationary satellite moves in a predetermined specific location in a satellite orbit.

11 Claims, 5 Drawing Sheets

(51) Int. Cl.
    *H04B 7/185*     (2006.01)
    *H04L 5/00*     (2006.01)
    *H04W 72/04*     (2009.01)
    *H04H 20/74*     (2008.01)

(52) U.S. Cl.
    CPC ......... *H04L 5/0053* (2013.01); *H04W 72/042* (2013.01); *H04H 20/74* (2013.01)

(56) References Cited

FOREIGN PATENT DOCUMENTS

| | | |
|---|---|---|
| JP | 10-190550 A | 7/1998 |
| JP | 10-285098 A | 10/1998 |
| JP | 2001-313599 A | 11/2001 |
| JP | 2004-297655 A | 10/2004 |

\* cited by examiner

SATELLITE COMMUNICATION SYSTEM AND SATELLITE COMMUNICATION GROUND APPARATUS

FIELD

This invention relates to a diversity technique in satellite communications.

BACKGROUND

Conventional satellite communication systems typically use, as a scheme to improve communication quality when a radio communication channel between a satellite and an earth station is degraded in quality by the influence of rain or the like, a site diversity scheme in which an alternate earth station connected by a wired channel to an earth station affected by rain or the like communicates with a satellite to avoid or reduce degradation in communication quality (Patent Literature 1).

CITATION LIST

Patent Literature

Patent Literature 1: Japanese Patent Application Laid-Open No. S63-179629 (FIG. 1)

SUMMARY

Technical Problem

However, when the above-described conventional site diversity scheme is applied to satellite communications using a non-geostationary satellite, an alternate earth station is necessary when the non-geostationary satellite communicates with an earth station, and thus it is necessary to provide ground stations such that a plurality of earth stations can simultaneously communicate with the non-geostationary satellite. Thus, there is a problem in that the number of earth stations to be installed increases.

This invention has been made to solve the above problem, and has an object of providing a satellite communication system and a satellite communication ground apparatus (ground station) capable of obtaining a diversity effect to improve communication quality without providing zearth stations such that there is a plurality of earth stations that can simultaneously communicate with a non-geostationary satellite.

Solution to Problem

A satellite communication system according to an aspect of the present invention includes: a plurality of satellite communication ground apparatuses to decode data encoded by an error-detecting code received over a downlink channel, and request retransmission on the data in which an error has been detected by the decoding; and a non-geostationary satellite to emit radio waves on the downlink channel to transmit the data to the satellite communication ground apparatuses by the downlink channel, and retransmit the data that the non-geostationary satellite has been requested by the satellite communication ground apparatuses to retransmit, intensively in a time period during which the non-geostationary satellite moves in a predetermined specific location in a satellite orbit.

A satellite communication ground apparatus according to another aspect of the present invention is used in a satellite communication system including a non-geostationary satellite to emit radio waves on a downlink channel to transmit data encoded by an error-detecting code by the downlink channel, and retransmit the data that the non-geostationary satellite has been requested to retransmit, intensively in a time period corresponding to a predetermined specific location in a satellite orbit, the apparatus including: an antenna to receive radio waves on the downlink channel; a demodulator to demodulate a signal received by the antenna; a decoder to perform decoding by the error-detecting code on the signal demodulated by the demodulator; and a controller to generate the retransmission request on the data in which an error has been detected as a result of decoding by the decoder.

Advantageous Effects of Invention

A satellite communication system in this invention includes a plurality of satellite communication ground apparatuses that decodes data encoded by an error-detecting code received over a downlink channel, and transmits a retransmission request on data in which an error has been detected by the decoding, and a non-geostationary satellite that emits radio waves on the downlink channel, transmits data to the satellite communication ground apparatuses by the downlink channel, and retransmits data for which the non-geostationary satellite has received a retransmission request, intensively in a time period during which the non-geostationary satellite moves in a predetermined specific location in a satellite orbit. Thus, by the non-geostationary satellite performing retransmission in a time period during which the non-geostationary satellite is in the specific location in the satellite orbit, a site diversity effect due to retransmission can be obtained without providing ground communication stations such that a plurality of ground communication stations can simultaneously communicate with the non-geostationary satellite.

A satellite communication ground station in this invention includes an antenna that receives radio waves on a downlink channel, a demodulator that demodulates a signal received by the antenna, a decoder that decodes an error-detecting code on a signal demodulated by the demodulator, and a controller that generates a retransmission request for data in which an error has been detected as a result of decoding by the decoder, and can receive data encoded by the error-detecting code transmitted by the non-geostationary satellite by the downlink channel, detect the presence or absence of an error in the data, request retransmission of the data when an error has occurred therein, and receive retransmission data transmitted by the non-geostationary satellite in response to the retransmission request, intensively in a time period during which the non-geostationary satellite moves in a predetermined specific location in a satellite orbit, so that a diversity effect can be obtained without providing satellite communication ground apparatuses such that there is a plurality of satellite communication ground apparatuses that can simultaneously communicate with the non-geostationary satellite.

DESCRIPTION OF EMBODIMENTS

Hereinafter, embodiments of this invention will be described in detail with reference to the drawings. In the drawings referred to hereinafter, the same or corresponding parts are given the same reference numerals and letters.

First Embodiment

Figure 1:
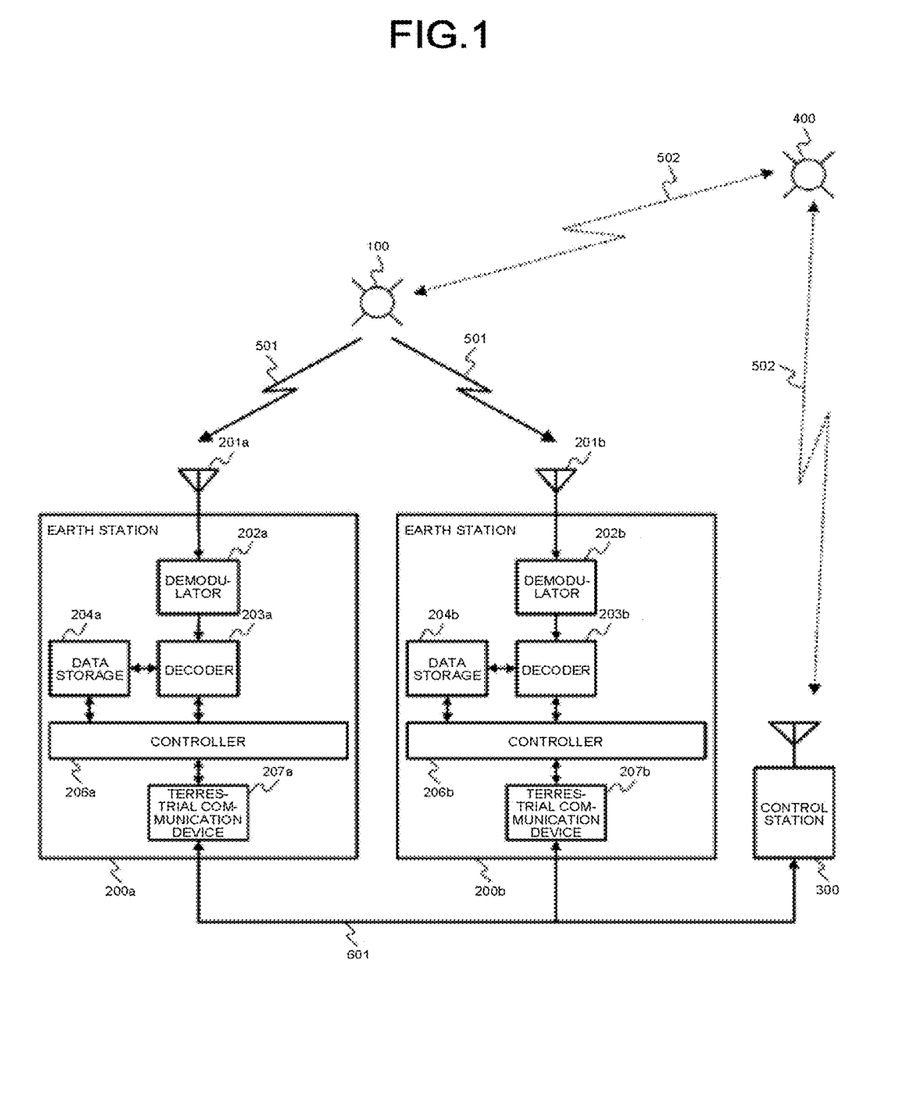
FIG. 1 is a block diagram illustrating an example of the configuration of a satellite communication system according to a first embodiment of this invention.

FIG. 1 is a block diagram illustrating an example of the functional configuration of earth stations (satellite communication ground apparatuses) 200 according to the first embodiment of this invention, and illustrating a configuration example of a satellite communication system according to this embodiment configured using the earth stations 200. The satellite communication system illustrated in FIG. 1 includes a non-geostationary satellite 100, the earth stations 200 (200a, 200b), a control station 300, and a geostationary satellite 400. Although FIG. 1 illustrates two earth stations for the sake of simplifying explanation, three or more earth stations may be provided in a predetermined area on the earth with which the non-geostationary satellite 100 performs communication. Assume that the non-geostationary satellite 100 moves in a direction from the earth station 200a to the earth station 200b in FIG. 1.

In FIG. 1, a downlink channel 501 is a satellite communication channel over which the non-geostationary satellite 100 transmits data by radio signals to the earth stations 200. A control channel 502 is a satellite communication channel for control over which the control station 300 communicates with the non-geostationary satellite 100 via the geostationary satellite 400. Assume that the geostationary satellite 400 is in a state of being able to communicate with the control station 300 at all times. Assume that when the non-geostationary satellite 100 is in an area in which the non-geostationary satellite 100 can communicate with any one of the earth stations 200, the geostationary satellite 400 can communicate with the non-geostationary satellite 100. In this example, the control station 300 is configured to control the non-geostationary satellite 100 using the geostationary satellite 400 as a relay satellite. It is also possible to provide a control channel between the control station 300 and the non-geostationary satellite 100 for direct control.

A terrestrial channel 601 is a terrestrial communication channel interconnecting the earth station 200a, the earth station 200b, and the control station 300. Here, the terrestrial channel 601 is a wired communication channel, a communication channel to which an existing communications technology such as an Internet Protocol (IP) communication network or a dedicated line network is applied. The terrestrial channel 601 may alternatively be a radio communication channel to which an existing ground radio communications technology is applied.

The non-geostationary satellite 100 transmits data (transmission data) to the earth stations 200 by the downlink channel 501. When the earth stations 200a and 200b are within an irradiation area of a radio signal (radio waves) on the downlink channel 501, the radio signal on the downlink channel 501 is received by the earth station 200a and the earth station 200b. There is a case where, due to the effect of rain attenuation or the like, the earth stations 200, even located within the irradiation area, cannot normally receive a radio signal on the downlink channel 501, and there is a case where only one of the earth stations 200a and 200b can receive a radio signal on the downlink 501, depending on the location of the satellite.

In the latter case, when the non-geostationary satellite 100 is moving in a direction from the earth station 200a to the earth station 200b as described above, the earth station 200a first enters the irradiation area of radio waves on the downlink channel 501 as the non-geostationary satellite 100 moves, and only the earth station 200a can receive a radio signal on the downlink channel 501. Then, as time goes on, the earth station 200b enters the irradiation area of radio waves on the downlink channel 501, and the earth station 200b can also receive a radio signal on the downlink channel 501. When more time elapses and the earth station 200a is outside the irradiation area of radio waves on the downlink channel 501, a radio signal on the downlink channel 501 can be received only by the earth station 200b. After a while, both of the earth stations 200a and 200b are outside the irradiation area of radio waves on the downlink channel 501, and radio signals on the downlink channel 501 cannot be received by the earth stations 200.

The non-geostationary satellite 100 encodes transmission data to the earth stations 200 using an error-detecting code, modulates the encoded data (encoded data) using an existing modulation technique such as phase modulation or quadrature phase amplitude modulation, and transmits the data modulated (modulated data) by a radio signal on the downlink channel 501. Here the error-detecting code includes an error-correcting code. In this embodiment, a low-density parity-check (LDPC) code that is an error-correcting code is used. This invention is not limited to a specific encoding scheme, and other encoding schemes such as a turbo code and a Reed-Solomon code may be used. The non-geostationary satellite 100 has a function of retransmitting transmission data according to a retransmission request indicated by the receiving side of transmission data, and performs retransmission in a predetermined specific timing (time period). This invention does not limit a retransmission scheme that the non-geostationary satellite 100 uses to a specific scheme. A typical retransmission scheme such as Chase Combining or Incremental Redundancy is applicable.

Data transmitted by the non-geostationary satellite 100 to the earth stations 200 is data received from the earth stations 200 when the non-geostationary satellite 100 is a communication satellite, or is observation data obtained from a sensor that the non-geostationary satellite 100 has when the non-geostationary satellite 100 is an observation satellite. FIG. 1 does not illustrate an uplink channel from the earth stations to the non-geostationary satellite 100 and a configuration of data transmission over the uplink, channel, or the configuration of an observation sensor or the like for obtaining observation data. These configurations can be implemented by applying an existing satellite communication scheme to the non-geostationary satellite 100 and the earth stations 200, and mounting an existing observation sensor (e.g. camera) on the non-geostationary satellite 100.

As illustrated in FIG. 1, the earth stations 200 each include an antenna 201, a demodulator 202, a decoder 203, a data storage (memory) 204, a controller 206, and a terrestrial channel communication device 207. The two earth stations 200 (200a, 200b) are illustrated in FIG. 1. In order to distinguish the respective antennas 201 and the others that they have, the antennas 201 are denoted as antennas 201a, 201b, and the others likewise.

The antenna 201 of each of the earth stations 200 receives a radio signal on the downlink channel 501 transmitted by the non-geostationary satellite 100. The demodulator 202 demodulates the signal received by the antenna 201 (received signal) by a demodulation scheme corresponding to a modulation scheme performed by the non-geostationary satellite 100 at the time of transmission. On the data demodulated by the demodulator 202 (demodulated data), the decoder 203 performs decoding corresponding to encoding performed by the non-geostationary satellite 100 at the time of transmission, to obtain data transmitted by the non-geostationary satellite 100. As described above, when the data is encoded by an LDPC code, the data can be decoded by a known sum-product method.

When the decoder 203 detects an error in the decoding of the data demodulated by the demodulator 202, the decoder 203 stores a soft-decision value of the demodulated data in the data storage 204, and notifies the controller 206 of the error occurrence. When an error-correcting code is used, a case where there is a remaining error after decoding is regarded as error occurrence. The controller 206 transmits to the terrestrial channel communication device 207 a request for retransmission of transmission data in which an error has occurred, addressed to the non-geostationary satellite 100. The terrestrial channel communication device 207 transmits the received retransmission request to the non-geostationary satellite 100 to the control station 300 by the terrestrial channel 601. The control station 300 receives the retransmission request and transmits the retransmission request to the non-geostationary satellite 100 via the geostationary satellite 400.

The control station 300 is a ground apparatus performing the control of the non-geostationary satellite 100, and transmits control data to the non-geostationary satellite 100 by a control channel 502 passing through the geostationary satellite 400 used as a relay satellite. The control station 300 transmits retransmission requests received from the earth stations 200 to the non-geostationary satellite 100. The non-geostationary satellite 100 performs retransmission of transmission data in response to a retransmission request the non-geostationary satellite 100 has received. Transmission data retransmitted by the non-geostationary satellite 100 is received by the earth stations 200 in the same manner as at the time of initial transmission. At this time, the decoder 203 can combine a soft-decision value of initial demodulated data stored in the data storage 204 (pre-decoding data) and a soft-decision value of retransmitted demodulated data for decoding.

Next, operations will be described. The non-geostationary satellite 100 encodes and modulates transmission data as described above, and transmits the encoded and modulated transmission data to the earth stations 200 by the downlink channel 501. When the earth stations 200a and 200b are in the irradiation area of radio waves on the downlink channel 501, a radio signal on the downlink channel 501 is received by the antenna 201a of the earth station 200a and the antenna 201b of the earth station 200b. The signals received by the antennas 201a and 201b are demodulated by the demodulators 202a and 202b, respectively. In addition, pieces of the demodulated data demodulated by the demodulators 202a and 202b are decoded by the decoders 203a and 203b, respectively. The decoders 203a and 203b transmit decoding results to the controllers 206a and 206b, respectively. Here, a decoding result includes identification information added to data of each unit of retransmission according to a retransmission method used, and decoded data when the data can be normally decoded, or an error notification when the data cannot be normally decoded. When decoding has failed, a soft-decision value of demodulated data may be indicated together. The decoders 203a and 203b store soft-decision values of the pieces of demodulated data in the data storages 204a and 204b, respectively.

Further, the controllers 206a and 206b of the earth stations 200a and 200b exchange to each other or transfer from one side to the other side identification information on each unit of retransmission and decoded data or an error notification corresponding to the identification information received from the decoders 203a and 203b, respectively, by the terrestrial channel 601 via the terrestrial channel communication devices 207a and 207b. When the terrestrial channel 601 is an IP network, for example, previously storing each others' IP addresses easily enables the terrestrial channel communication devices 207a and 207b of the respective earth stations 200a and 200b to communicate. Here, assume that decoded data or an error notification is transferred from the earth station 200a to the earth station 200b. Information transmitted from the earth station 200a to the earth station 200b is passed to the controller 206b via the terrestrial channel communication device 207b.

The controller 206b determines transmission data that needs to be retransmitted on units of retransmission, from identification information for each retransmission unit and demodulated data or an error notification corresponding to the identification information at the earth station 200a that the controller 206a has received from the earth station 200a, and identification information on units of retransmission and demodulated data or an error notification corresponding to the identification information, which serve as a reception result at the earth station 200b that is received from the decoder 203b. Here, transmission data that needs to be retransmitted is transmission data of the non-geostationary satellite 100 that neither of the earth stations 200a and 200b has been able to normally receive due to the occurrence of errors at both of the earth stations 200a and 200b. Then, the controller 206b transmits a request for retransmission of the transmission data that needs to be retransmitted to the control station 300 by the terrestrial channel 601 via the terrestrial channel communication device 207b. Communication between the earth station 200b and the control station 300 can be easily performed by a known technique like communication between the earth stations 200a and 200b.

When a soft-decision value is transferred from the earth station 200a to the earth station 200b, the controller 206b may transmit the soft-decision value to the decoder 203b so that the soft-decision value is combined with a soft-decision value stored in the data storage 204b for decoding, and retransmission may be requested on transmission data that has not been normally received on the basis of a result of the combining.

The control station 300 transmits a retransmission request received from the earth station 200b to the non-geostationary satellite 100 via the geostationary satellite 400. The non-geostationary satellite 100 retransmits transmission data that is requested to be retransmitted in response to the retransmission request that the non-geostationary satellite 100 has received. The control station 300 may directly notify the non-geostationary satellite 100 of a retransmission request without using the geostationary satellite 400 as described above. Alternatively, the earth stations 200 may directly send a retransmission request to the geostationary satellite 100 without causing the retransmission request to pass through the control station 300. To retransmission requests from the earth stations 200 to the non-geostationary satellite 100, an uplink (link from the ground side to the satellite side) communication technology in an existing satellite communication technology is applicable.

For example, when the earth station 200b has failed to normally receive a certain piece of transmission data and the earth station 200a has succeeded in normally receiving the same, transferring the piece of data normally received at the earth station 200a to the earth station 200b via the terrestrial channel 601 eliminates the need for the earth station 200b to request the retransmission of that piece of data. When received pieces of data that have been normally received are mutually exchanged via the terrestrial channel 601 like this, data can be processed as being normally received without requesting retransmission from the non-geostationary satellite 100 when the data is normally received at any one of the earth stations 200. Further, on transmission data of the non-geostationary satellite 100 that both the earth station 200a and the earth station 200b have failed to receive, by transferring a soft-decision value of the data from the earth station 200a to the earth station 200b, for example, and combining soft-decision values of both of the earth stations 200 to be demodulated or decoded at the earth station 200b, normal received data can be obtained, and error occurrence can be avoided or reduced.

The geostationary satellite 100 retransmits, in response to a retransmission request received by the geostationary satellite 100, transmission data that is specified. A retransmitted signal is received by both of the earth stations 200a and 200b or one of them. For decoding of a retransmitted received signal, a method of simply decoding the received signal as at the time of initial transmission, a method of combining the received signal with a soft-decision value at the time of initial transmission and decoding the combined signal, or the like is conceivable. In the latter case, the earth stations 200 need to hold soft-decision values obtained at the time of initial transmission. This can be performed by the use of the data storage 204 as described above.

When reception results are exchanged between the earth station 200a and the earth station 200b, both of the earth stations 200 may request retransmission. In this case, the non-geostationary satellite 100 may perform retransmission in response to retransmission requests from both, or may retransmit only transmission data that has been requested for retransmission by both in common.

When retransmission control is performed in data transmission from a satellite, how frequently retransmission requests are transmitted to the satellite that is on the transmission side, a time delay in a control loop, and the like are typical problems. The non-geostationary satellite 100 in the satellite communication system according to this embodiment controls timing at which the non-geostationary satellite 100 retransmits transmission data specified by a retransmission request, to be a specific timing. Here, the specific timing is determined based on the location in a satellite orbit. Since the time when the non-geostationary satellite 100 reaches a specific location can be determined in advance, the non-geostationary satellite 100 can determine a retransmission timing. The earth stations 200 can wait for a timing in which retransmission is performed, and can combine received retransmission data with previously received data, or combine the received retransmission data with a signal obtained at the time of initial transmission for demodulation or decoding.

Alternatively, the earth stations 200 requesting retransmission or the control station 300 relaying the request may determine a timing of retransmission. In that case, timing information (e.g. an absolute or relative time) may be added to a retransmission request that is to be transmitted to the non-geostationary satellite 100. When the control station 300 determines a timing of retransmission, the earth stations 200 can be notified of a timing in which the non-geostationary satellite 100 performs retransmission via the terrestrial channel 601. Alternatively, timing for the earth stations 200, the control station 300, or the like to transmit a retransmission request to the non-geostationary satellite 100 may be adjusted such that a retransmission timing is set to a predetermined specific timing.

Figure 2:
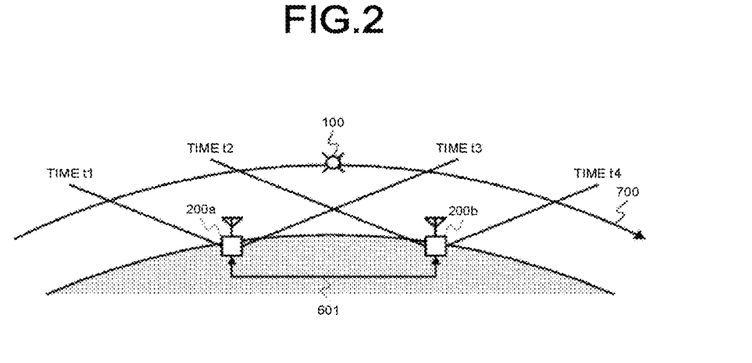
FIG. 2 is a schematic diagram illustrating an example of the positional relationships between a non-geostationary satellite and ground communication stations in the satellite communication system according to the first embodiment of this invention.
Figure 3:
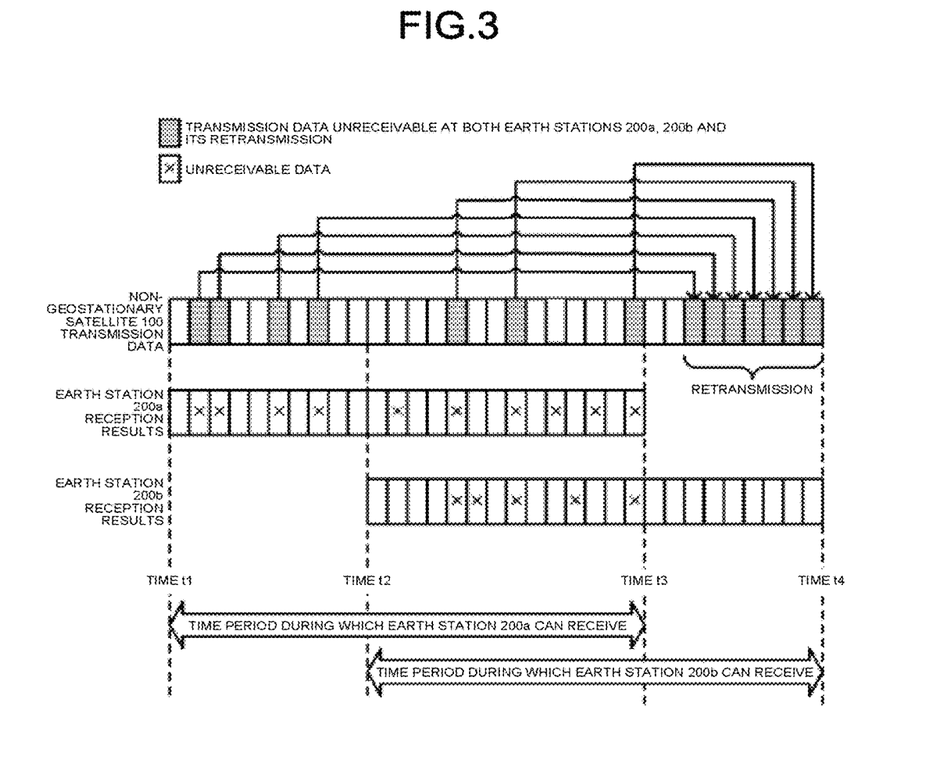
FIG. 3 is a schematic diagram illustrating an example of a retransmission operation of the satellite communication system according to the first embodiment of this invention.

With reference to FIGS. 2 and 3, an example of an operation in which the non-geostationary satellite 100 performs retransmission intensively in a specific timing will be described in detail. FIG. 2 is a schematic diagram illustrating an example of the positional relationships between the non-geostationary satellite 100 and the earth stations 200. Here, the operation is described on the assumption of the positional relationships illustrated in FIG. 2. In FIG. 2, the non-geostationary satellite 100 moves along a satellite orbit 700 in an arrow direction. The non-geostationary satellite 100 gradually moves closer to the earth station 200a from the left side in FIG. 2. At a time t1, the non-geostationary satellite 100 can communicate with the earth station 200a. Then at a time t2, the non-geostationary satellite 100 can communicate also with the earth station 200b. At a time t3 after a lapse of more time, the non-geostationary satellite 100 cannot communicate with the earth station 200a. Then, at a time t4, the non-geostationary satellite 100 cannot communicate also with the earth station 200b.

FIG. 3 illustrates an example of transmission data transmitted by the non-geostationary satellite 100 over the downlink channel 501, and reception statuses (reception results) of the transmission signal at the earth station 200a and the earth station 200b between the time t1 and the time t4 illustrated in FIG. 2. In FIG. 3, from the time t1 to the time t3 is a time period during which the earth station 200a can receive a radio signal on the downlink channel 501. From the time t2 to the time t4 is a time period during which the earth station 200b can receive a radio signal on the downlink channel 501. Between the time t1 and the time t4, the non-geostationary satellite 100 transmits transmission data over the downlink channel 501. In FIG. 3, each rectangle represents each piece of data in a unit of retransmission (hereinafter referred to as a packet) according to a retransmission scheme used in this communication system. In the reception results at the earth stations 200, a piece of data in which a reception error has occurred is marked by "x." In the transmission data of the non-geostationary satellite 100, hatched rectangles represent initial transmission of pieces of transmission data, which are retransmitted, and the retransmission of the same.

Between the time t1 and the time t3, the earth station 200a can receive a radio signal on the downlink channel 501. Between the time t1 and the time t2 of this period, only the earth station 200a can receive a radio signal on the downlink channel 501, so that packets in which reception errors have occurred at the earth station 200a during this period of time are managed by the controller 206a of the earth station 200a as packets that need to be retransmitted. Specifically, pieces of packet identification information (e.g. identification numbers) added to the packets are held as pieces of identification information on the packets that need to be retransmitted.

Next, between the time t2 and the time t3, both the earth station 200a and the earth station 200b can receive a radio signal on the downlink channel 501, so that a packet that has been able to be received without errors at one of them does not need to be retransmitted. Thus, the earth station 200a can manage only packets in which reception errors have occurred at both of the earth stations 200 as packets that need to be retransmitted. This is enabled by the earth station 200a receiving notification of packet reception statuses from the earth station 200b via the terrestrial channel 601. Notification of packet reception statuses from the earth station 200b may be performed spontaneously by the earth station 200b, or may be performed by the earth station 200b in response to an inquiry by the earth station 200a. This operation corresponds to selection diversity of reception results at the earth stations 200a and 200b. Maximal ratio combining diversity in which a soft-decision value of a packet in which an error has occurred is transferred from the earth station 200b and combined at the earth station 200a as described above may be used.

For packets that have not been received normally at neither of the earth stations 200a and 200b due to the occurrence of errors between the time t1 and the time t3, the earth station 200a collects their identification numbers, and requests retransmission to the non-geostationary satellite 100 via the control station 300 and the geostationary satellite 400. The non-geostationary satellite 100 starts preparation for retransmission of the packets for which the non-geostationary satellite 100 received the retransmission request.

Between the time t3 and the time t4, only the earth station 200b can receive a radio signal on the downlink channel 501. In this time period, the non-geostationary satellite 100 retransmits packets for which retransmission is requested. In the example in FIG. 3, the non-geostationary satellite 100 disposes retransmission packets close together to the back in the time direction and transmits them in the time period between the time t3 and the time t4. When the number of packets to be retransmitted is fewer than the number of packets that can be transmitted from the time t3 to the time t4, and a retransmission request reaches the non-geostationary satellite 100 with a time required to transmit retransmission packets remaining, all retransmission packets can be transmitted in the time period between the time t3 and the time t4. Otherwise, the earth station 200a may limit the number of packets of which the earth station 200a requires retransmission by one retransmission request, and for packets of which the earth station 200a has not been able to request retransmission, the earth station 200a may request the retransmission thereof after waiting until the earth station 200a can communicate with the non-geostationary satellite 100 next time. Alternatively, the earth station 200a may transmit retransmission requests in a plurality of times to the non-geostationary satellite 100.

The satellite orbit 700 in which the non-geostationary satellite 100 circles is fixed, and the circling cycle is also fixed. Thus, it is easy to get at what time the non-geostationary satellite 100 passes through what location in the satellite orbit 700 by calculation in advance, and it is possible to control the timing for the non-geostationary satellite 100 to transmit retransmission packets such that the timing is set to a specific timing. The earth station 200b can know in advance the timing in which the non-geostationary satellite 100 transmits retransmission packets. The earth station 200b can wait for data retransmitted in the timing in which retransmission is performed. Further, it is possible to perform selection combining in which received retransmission data is combined with previously received data, or combine the received retransmission data with a signal of the time of initial transmission to be demodulated or decoded.

The control station 300 that relays a retransmission request may control timing of retransmission, or the non-geostationary satellite 100 may determine a timing to start retransmission. Retransmission timing information (e.g. an absolute or relative time) may be added to a retransmission request to request retransmission from the non-geostationary satellite 100. When the control station 300 determines a timing of retransmission, the earth stations 200 can be notified of a timing in which the non-geostationary satellite 100 performs retransmission via the terrestrial channel 601.

In FIG. 3, in each of the time periods between the time t1 and the time t2 and the time t3 and the time t4, only one earth station 200 can receive a signal, and the elevation angle of the non-geostationary satellite 100 is small. Thus, it is considered that packet errors are more likely to occur than in the time period between the time t2 and the time t3. The satellite communication system according to this embodiment applies site diversity, to packets transmitted in the time period between the time t1 and the time t2 during which communication with only one earth station 200 is possible, in the time period between the time t3 and the time t4 during which communication with only another earth station 200 is possible.

Although this embodiment has described the satellite communication system with two earth stations 200 as an example, the same effect can be obtained even when the number of earth stations 200 is three or more. Further, a suitable combination of earth stations 200 may be selected from among three or more earth stations 200, on the basis of location information on the earth stations 200 and geographical information on the surroundings of the earth stations 200, information on weather around the earth stations 200 and information on the ionosphere above, satellite orbit information, and the like. This selection can improve the efficiency of data transmission during one satellite passage.

Although FIG. 3 illustrates an example where retransmission is performed with packets put close together to the back in the time period between the time t3 and the time t4, this does not necessarily need to be done that way. There are no restrictions on the start and end times of that time period as long as a time period during which retransmission is performed is blocked to increase the efficiency of retransmission control. Further, although FIG. 3 illustrates an example where the time period during which retransmission is performed is shown in one block, there is no need to limit the time period to be in one block. There may be a plurality of blocks. The number of blocks of the time period during which retransmission is performed and the time period of a block can be set as appropriate so as to achieve efficient transmission by considering the complexity of retransmission control and the transmission speed and delay time of control information, or the satellite orbit and the disposition of earth stations, geographical information, ionosphere information, weather information, or the like.

Although description has been given on the assumption that there is a time period during which a plurality of earth stations can receive a signal simultaneously in FIG. 3, the satellite communication system according to this embodiment is applicable even in the absence of this time period. In this case, the operation between the time t2 and the time t3 in FIG. 3 is omitted.

Although in the example in FIG. 3, an example where management of packets to be retransmitted and generation of a retransmission request are performed by an earth station 200 that first starts to communicate with the non-geostationary satellite 100 has been described, they do not necessarily need to be performed by the earth station 200a, and may be performed by any one of the earth stations 200 as long as the earth stations are interconnected to each other by the terrestrial channel 601. Further, a retransmission request to the non-geostationary satellite 100 may be generated by the control station 300. As a path in which a retransmission request is transmitted from the control station 300 to the non-geostationary satellite 100, an example of relaying by the geostationary satellite 400 has been described. Alternatively, another example in a form of direct transmission from the control station 300 to the non-geostationary satellite 100 can be adopted.

Figure 4:
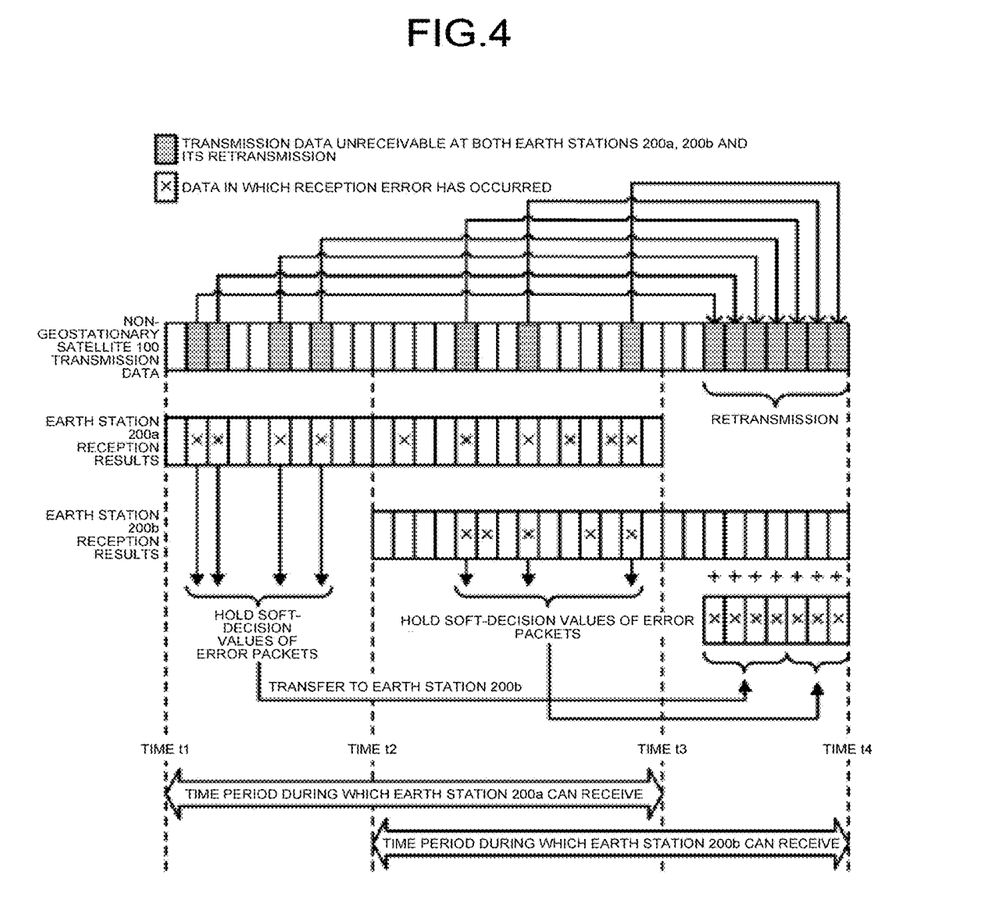
FIG. 4 is a schematic diagram illustrating an example of a retransmission operation of the satellite communication system according to the first embodiment of this invention.

Next, with reference to FIG. 4, another specific example of a retransmission operation performed by the non-geostationary satellite 100 will be described. In the example in FIG. 4, each of the earth stations 200 holds a soft-decision value of demodulated data corresponding to a packet in which a reception error has occurred. The holding of soft-decision values is performed by the data storage 204 of each earth station 200. From the time t1 to the time t2, only the earth station 200a can receive a radio signal on the downlink channel 501, and thus the earth station 200a holds a soft-decision value of a packet in which a reception error has occurred. Retransmission of packets is performed by the non-geostationary satellite 100 during the time period between the time t3 and the time t4 as in the example in FIG. 3 described above, and thus only the earth station 200b receives. The controller 206a of the earth station 200a obtains from the data storage 204a soft-decision values of demodulated data of packets in which errors have occurred from the time t1 to the time t2, and transfers them to the earth station 200b via the terrestrial channel 601 before the non-geostationary satellite 100 performs retransmission. The controller 206b of the earth station 200b stores the received soft-decision values in the data storage 204b.

As for soft-decision values of demodulated data of packets in which reception errors have occurred at both of the earth station 200a and the earth station 200b between the time t2 and the time t3, holding by the earth station 200b the soft-decision values at the earth station 200b that receives retransmission packets is more efficient, because the communication band of the terrestrial channel 601 is not consumed by the transfer of soft-decision value data. The earth station 200b holds soft-decision values of packets received in error at the earth station 200b. When the communication speed of the terrestrial channel 601 is sufficiently high, soft-decision values obtained at the earth station 200a may be transferred to the earth station 200b, and further processing of combining the transferred soft-decision values obtained at the earth station 200a and the soft-decision values obtained at the earth station 200b and decoding them again, targeting only packets in which errors are left for retransmission, and holding the soft-decision values of the packets may be performed.

Generation of a retransmission request to the non-geostationary satellite 100 is the same as in the example in FIG. 3. The non-geostationary satellite 100 retransmits packets specified in a retransmission request from the time t3 to the time t4 as in the example in FIG. 3. A method of receiving retransmission packets at the earth station 200b in this example is different from that in the example in FIG. 3. In this example, the earth station 200b holds soft-decision values of packets obtained at the time of initial transmission, and combines them with soft-decision values of retransmitted packets before decoding. This enables more improvement in the communication quality of retransmission packets than in the example in FIG. 3.

As above, the above-described satellite communication system in this embodiment includes a plurality of earth stations that decodes data encoded by an error-detecting code received over a downlink channel, and transmits a retransmission request on data in which an error has been detected by the decoding, and a non-geostationary satellite that emits radio waves on the downlink channel, transmits data to the earth stations over the downlink channel, and retransmits data for which the non-geostationary satellite has received a retransmission request, intensively in a time period during which the non-geostationary satellite moves in a predetermined specific location in a satellite orbit. Because the non-geostationary satellite performs retransmission in the time period during which the non-geostationary satellite is in the specific location in the satellite orbit, a site diversity effect by retransmission can be obtained without providing ground communication stations such that a plurality of ground communication stations can simultaneously communicate with the non-geostationary satellite.

Further, making the time period during which the non-geostationary satellite is in the specific location in the satellite orbit contain at least part of a time period during which an earth station that lastly is outside an irradiation area of radio waves on the downlink channel as the non-geostationary satellite moves is in the irradiation area can prevent occurrence of such a problem in that retransmission cannot be performed in time due to a delay time of a control loop from detection of errors at the satellite communication ground stations to execution of retransmission by the non-geostationary satellite. Further, because a time period during which it is considered that the elevation angle of a satellite when viewed from an earth station is small and communication quality is low is allocated to retransmission, it is effective in increasing the efficiency of utilization of time in which the non-geostationary satellite can communicate with earth stations.

Further, an earth station transfers pre-decoding data of data in which an error has been detected to another earth station that receives retransmission from the non-geostationary satellite, and the earth station receiving the pre-decoding data combines the pre-decoding data and retransmitted data for decoding, so that the possibility of error correction by an error-correcting code can be increased, and communication efficiency can be increased.

Second Embodiment

Figure 5:
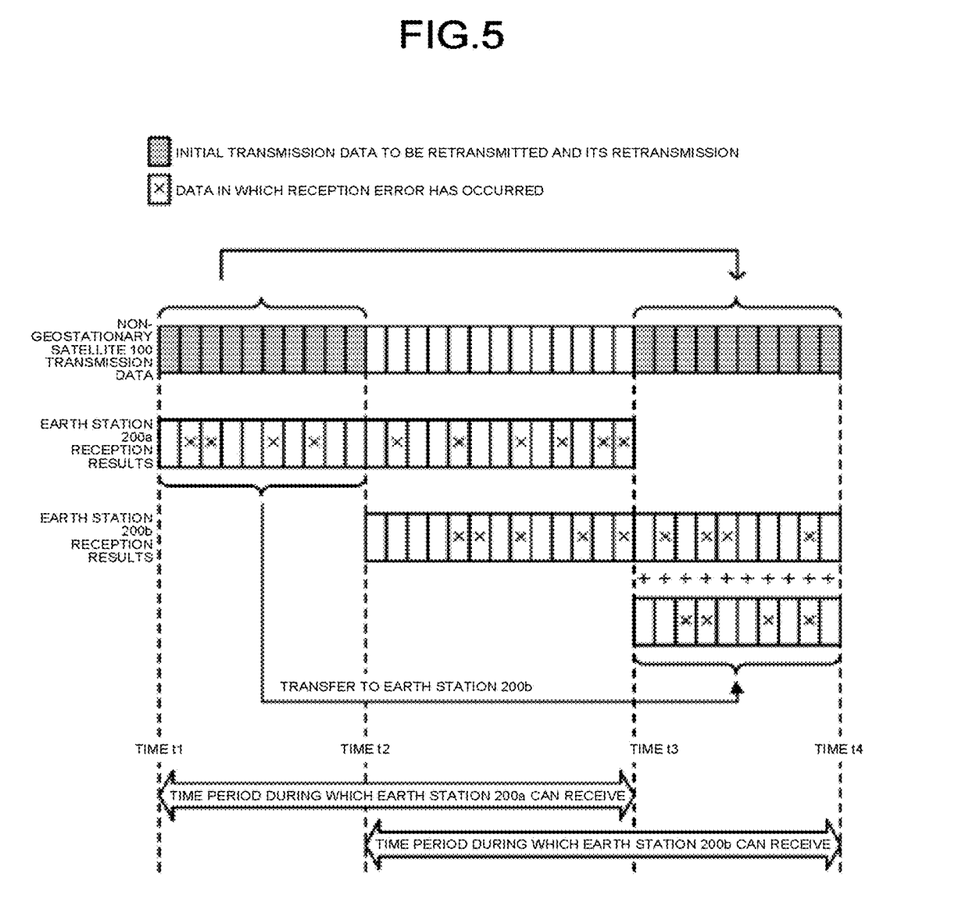
FIG. 5 is a schematic diagram illustrating an example of a retransmission operation of a satellite communication system according to a second embodiment of this invention.

Next, with reference to FIG. 5, a satellite communication system according to a second embodiment of this invention will be described. The configuration of the satellite communication system in this embodiment is identical to that in the first embodiment illustrated in FIG. 1. A basic operation thereof is also identical to that in the first embodiment. A difference from the first embodiment is that packets transmitted between times t1 and t2 are preset as target packets to be retransmitted. This eliminates the need for transmission of a retransmission request from earth stations 200 to a geostationary satellite 100. From the time t1 to the time t2, and from a time t3 to t4, there is only one earth station 200 that can receive a signal, unlike from the time t2 to the time t3. However, this operation enables the application of reception diversity at two earth stations 200 even though the receptions are temporally separated. Further, since initial transmission and retransmission are separated in time, even when the communication speed of a terrestrial channel 601 connecting the earth stations 200 is low, it is only necessary to transfer soft-decision values of initial transmission until retransmission, so that transfer can be performed easily.

As above, this embodiment predetermines target packets to be retransmitted, thereby eliminating the need for transmission of a retransmission request from earth stations to a non-geostationary satellite, and thus enabling simplification of control on the non-geostationary satellite.

In the above description, a modulation scheme may be changed at the transmission of retransmission packets from that of the initial transmission. For example, when the number of retransmission packets is small with respect to the duration of a time period for retransmission (from the time t3 to the time t4 in FIG. 3), the modulation level may be reduced, for example, to improve the quality of a communication channel. Further, when a retransmitted packet is combined with an initially transmitted packet, they may be weighted and combined using reception quality information such as signal power-to-noise power ratios of the initially transmitted packet and the retransmitted packet, or the signal power-to-noise power ratios may be reflected in advance in soft-decision values when they are generated so that the soft-decision values are simply combined together.

The above description has described a combining method using pre-decoding soft-decision values when soft-decision values are used. A method of combining pre-demodulation symbol values may be used as a matter of course. This combining may be performed by weighting and combining by the use of reception quality information as described above. For example, when initially transmitted and retransmitted reception symbol values are combined, maximal ratio combining of weighting them by their signal power-to-noise power ratios and then combining them in the same phase may be used.

Figure 6:
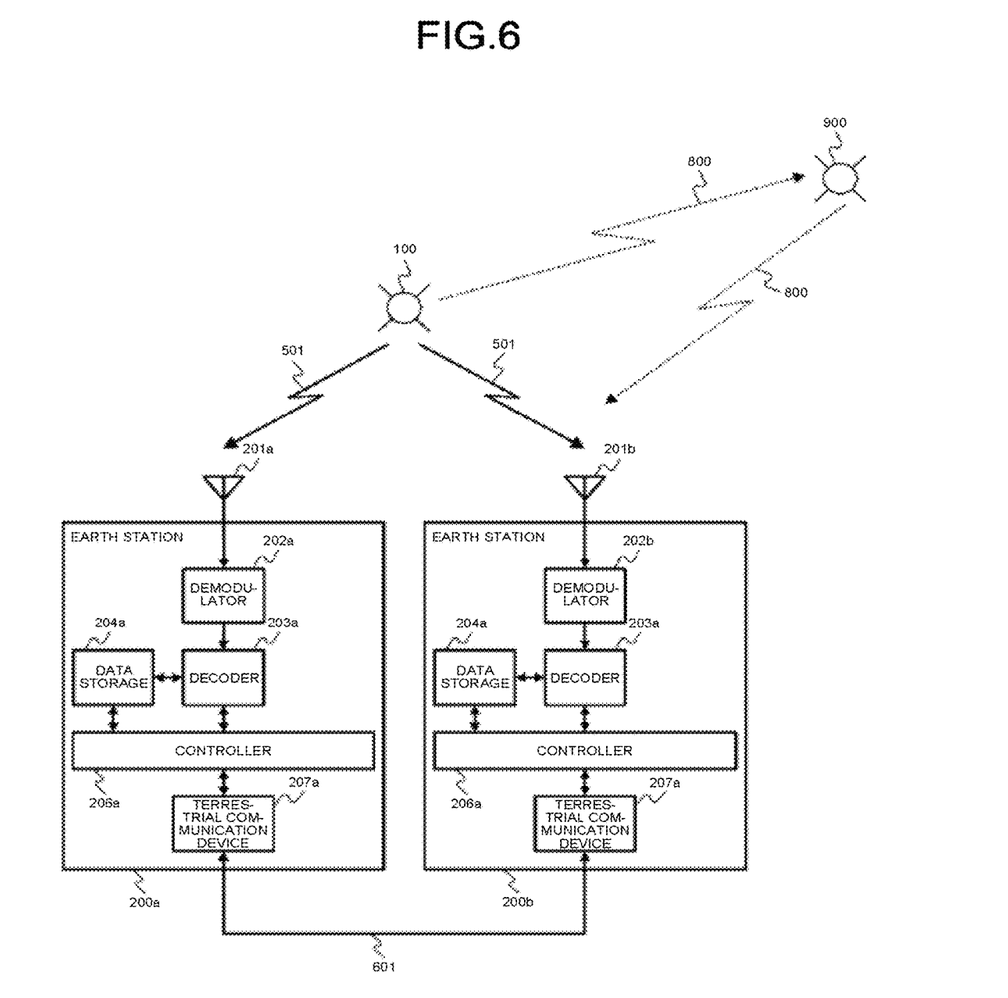
FIG. 6 is a block diagram illustrating a modification of the configuration of the satellite communication stem of this invention.

The above description has illustrated an example of combining reception results at earth stations of a signal transmitted over a downlink channel from a non-geostationary satellite. When there is a relay channel 800 connecting the non-geostationary satellite 100 and the earth stations 200 by a relay satellite 900 as illustrated in FIG. 6, combining may be performed, including results of packet transmission received by the earth stations 200 via the relay satellite 900. In this case, packets may be transmitted over the relay channel 800 as over a common downlink channel, and the earth stations 200 connected to the relay satellite 900 may receive the packets, or only retransmission packets may be transmitted over the relay channel 800. The latter example is useful when the data transmission speed of the relay channel 800 is lower than that of the downlink channel 501.

INDUSTRIAL APPLICABILITY

As above, a satellite communication system in this invention can obtain a diversity effect to improve communication quality without providing earth stations such that there is a plurality of earth stations that can simultaneously communicate with a non-geostationary satellite, and can create an efficient satellite communication environment.

REFERENCE SIGNS LIST 100 non-geostationary satellite, 200, 200a, 200b earth station (satellite communication ground apparatus), 201, 201a, 201b antenna, 202, 202a, 202b demodulator, 203, 203a, 203b decoder, 204, 204a, 204b data storage (memory), 206, 206a, 206b controller, 207, 207a, 207b terrestrial channel communication device, 300 control station, 400 geostationary satellite, 501 downlink channel, 502 control channel, 601 terrestrial channel, 700 satellite orbit, 800 relay channel, 900 relay satellite

The invention claimed is:

1. A satellite communication system comprising:
a plurality of satellite communication ground apparatuses to decode data encoded by an error-detecting code received over a downlink channel, and request retransmission on the data in which an error has been detected by the decoding; and
a non-geostationary satellite to emit radio waves on the downlink channel to transmit the data to the satellite communication ground apparatuses by the downlink channel, and retransmit the data that the non-geostationary satellite has been requested by the satellite communication ground apparatuses to retransmit, intensively in a time period during which the non-geostationary satellite moves in a predetermined specific location in a satellite orbit,
wherein the time period during which the non-geostationary satellite performs retransmission is during a time when (i) a first satellite communication ground apparatus among the satellite communication ground apparatuses is in an irradiation area of radio waves on the downlink channel (ii) a second satellite communication ground apparatus among the satellite communication ground apparatuses is outside of the irradiation area, and (iii) all of the plurality of satellite communication ground apparatuses are not simultaneously in the irradiation area.

2. The satellite communication system according to claim 1, wherein
the plurality of satellite communication ground apparatuses are each configured to transfer identification information on the data in which an error has been detected to any of the satellite communication ground apparatuses, and
the satellite communication ground apparatus that has received transfer of the identification information on the data in which the error has been detected excludes data that has been normally received at any of the satellite communication ground apparatuses from a retransmission target, and requests retransmission.

3. The satellite communication system according to claim 1, wherein
the plurality of satellite communication ground apparatuses are each configured to transfer data before decoding of the error-detecting code on the data in which an error has been detected to any of the satellite communication ground apparatuses located in an irradiation area of radio waves on the downlink channel in the time period during which the non-geostationary satellite performs retransmission, and
the satellite communication base station that has received the pre-decoding data combines data retransmitted by the non-geostationary satellite with the pre-decoding data for processing at a time of reception of the retransmitted data.

4. The satellite communication system according to claim 2, wherein
the plurality of satellite communication ground apparatuses are each configured to transfer pre-decoding data of the data in which the error has been detected together with the identification information on the data in which the error has been detected, and the satellite communication ground apparatus that has received transfer of the identification information on the data in which an error has been detected combines the transferred pre-decoding data and pre-decoding data received by the apparatus to perform decoding by the error-detecting code again, and requests retransmission on erroneous data after the decoding processing.

5. The satellite communication system according to claim 2, wherein the satellite communication ground apparatus receiving transfer of the identification information on the data in which an error has been detected is a satellite communication ground apparatus that first enters an irradiation area of radio waves on the downlink channel as the non-geostationary satellite moves in the satellite orbit.

6. The satellite communication system according to claim 1, wherein the time period during which the non-geostationary satellite performs retransmission is between a time when one of the satellite communication ground apparatuses that has first entered an irradiation area of radio waves on the downlink channel is outside the irradiation area and a time when all of the plurality of satellite communication ground apparatuses is outside the irradiation area.

7. The satellite communication system according to claim 1, wherein the time period during which the non-geostationary satellite performs retransmission contains at least part of a time period during which one of the satellite communication ground apparatuses that is lastly outside an irradiation area of radio waves on the downlink channel as the non-geostationary satellite moves is located in the irradiation area.

8. The satellite communication system according to claim 1, wherein, among data transmitted by the non-geostationary satellite from when at least one of the satellite communication ground apparatuses enters an irradiation area of radio waves on the downlink until all of the satellite communication ground apparatuses are outside the irradiation area, data to be retransmitted is predetermined, and the non-geostationary satellite performs retransmission without a request for retransmission from the satellite communication ground apparatuses.

9. The satellite communication system according to claim 8, wherein the data to be retransmitted is data transmitted from the non-geostationary satellite in a time period from when one of the satellite communication ground apparatuses enters the irradiation area as the non-geostationary satellite moves until two or more of the satellite communication ground apparatuses enter the irradiation area.

10. The satellite communication system according to claim 1, wherein the non-geostationary satellite and the satellite communication ground apparatuses transmit data using a relay channel from the non-geostationary satellite to the satellite communication ground apparatuses passing through a relay satellite, in addition to the downlink channel.

11. A satellite communication ground apparatus used in a satellite communication system including a non-geostationary satellite to emit radio waves on a downlink channel to transmit data encoded by an error-detecting code by the downlink channel, and retransmit the data that the non-geostationary satellite has been requested to retransmit, intensively in a time period corresponding to a predetermined specific location in a satellite orbit, the apparatus comprising:

an antenna to receive radio waves on the downlink channel;

a demodulator to demodulate a signal received by the antenna;

a decoder to perform decoding by the error-detecting code on the signal demodulated by the demodulator; and a controller to generate a retransmission request for requesting retransmission on the data in which an error has been detected as a result of decoding by the decoder, wherein the controller transfers to another satellite communication ground apparatus identification information on the data in which the error has been detected, and when receiving transfer of data corresponding to the identification information from the another satellite communication ground apparatus, the controller excludes the data corresponding to the identification information from a retransmission target and requests retransmission.

* * * * *